March 24, 1942.  J. HALTENBERGER  2,277,488
AUTOMOBILE WHEEL COVER
Filed April 1, 1938
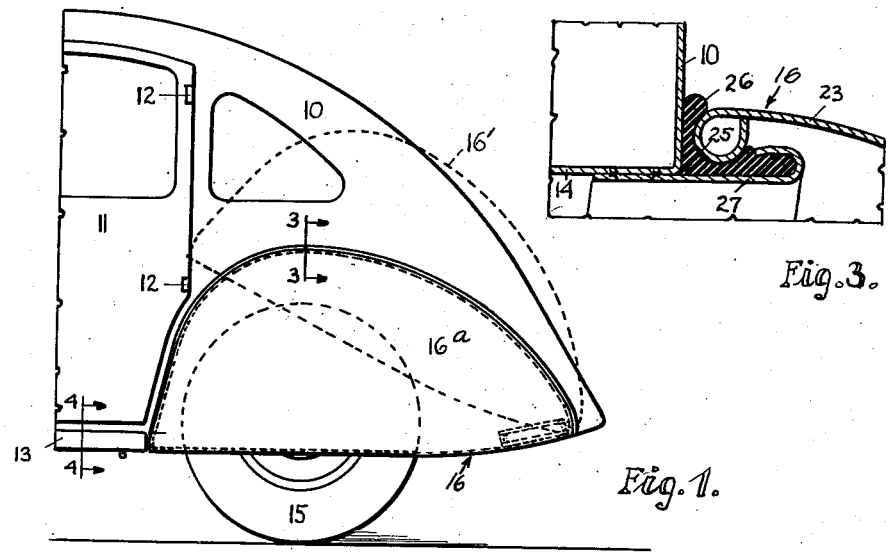
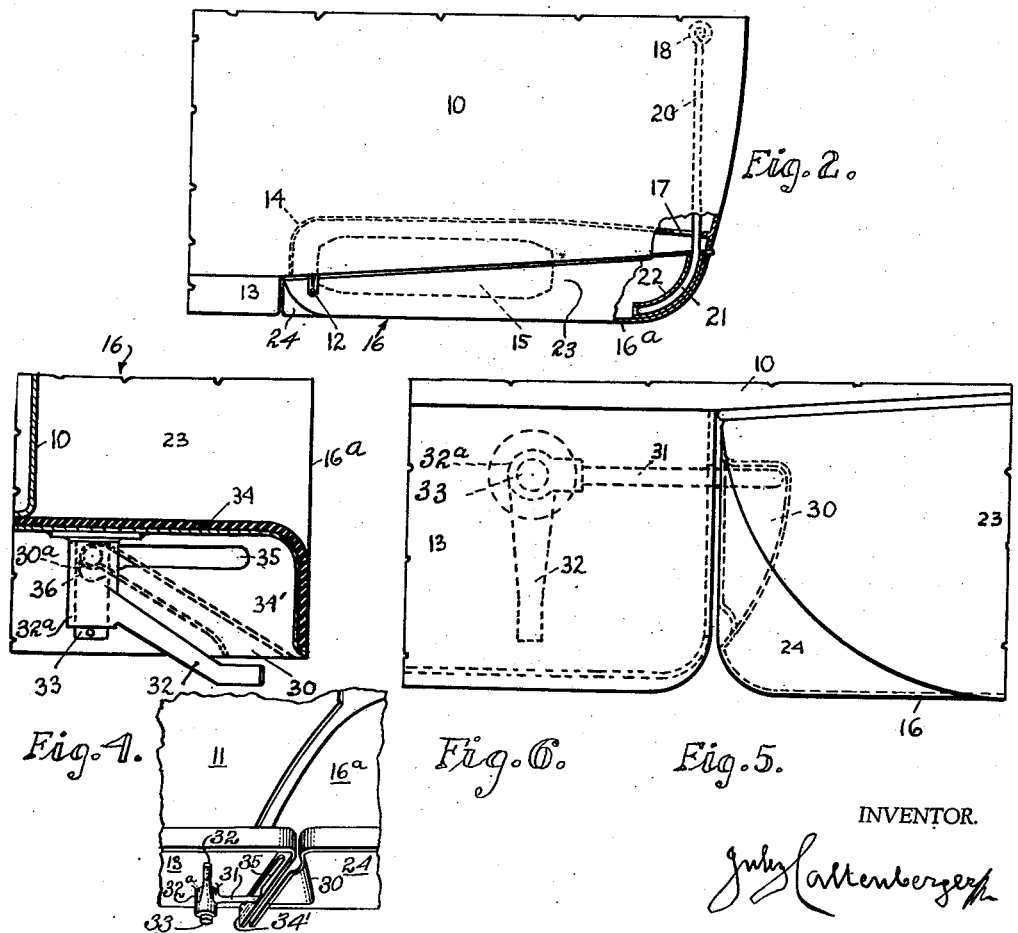
INVENTOR.
Jules Haltenberger Patented Mar. 24, 1942

2,277,488

UNITED STATES PATENT OFFICE 2,277,488

AUTOMOBILE WHEEL COVER

Jules Haltenberger, Ann Arbor, Mich.

Application April 1, 1938, Serial No. 199,362

11 Claims. (Cl. 280—153)

My invention relates to closed fenders and their mountings.

This application is a continuation-in-part of my co-pending application Serial No. 25,773, for Automobile wheel cover fastener, filed June 10, 1935, now Patent No. 2,115,768, granted May 3, 1938.

It is the object of my invention to provide a pleasing inexpensive closed fender for an automobile and to eliminate the use of fender shields now sold by automobile manufacturers while at the same time to make the wheel accessible for tire change and antiskid chain mounting while on the road.

Closed fenders were proposed at least in designs, open hinged fenders were also proposed, here it is proposed to provide a closed fender with a waterproof and inexpensive mounting that permits a vertical and limited lateral motion of the fender so as not to increase the width of the automobile while changing tires on a heavily trafficked road.

Further objects of my invention will appear as the description proceeds.

The accompanying drawing illustrates my invention. Here Fig. 1 is a side elevation of the rear part of an automobile; Fig. 2 is a plan elevation of one half of the rear part of an automobile illustrated in Fig. 1; Fig. 3 is a section substantially on lines 3—3 of Fig. 1, here illustrated on a larger scale; Fig. 4 is a section substantially on lines 4—4 of Fig. 1, illustrated on a larger scale; Fig. 5 is a plan view of Fig. 4 shown in the scale of Fig. 4; Fig. 6 is an isometric view of the clamping and opening latch shown in Figs. 4 and 5.

Referring to the drawing it will be seen that an automobile body 10 is provided with a rear door 11 arranged to be supported by upper and lower door hinges 12.

The body is provided with a usual running board 13 and a usual wheel house having a wall 14 surrounding a driving wheel 15. Substantially aligned with the wheel house is mounted a closed fender or wheel concealing shield indicated generally at 16.

At the rear of wheel house wall a substantially horizontal slot 17 is provided; it is of sufficient size to permit the passing of eyelet 18, the anchoring part of a torsion hinge 20. The outer end of this torsion hinge is formed to an arcuate portion 21 and it is laced in a tubing 22, this tubing forming a part of the rear end of the closed fender 16.

It is important to note that the eyelet 18 when secured to the body (in any suitable manner) is in torsional strain on torsion hinge 20, that is in relation to the forwardly curved arcuate end portion 21. The direction of strain being a force to tend to lift the forward end of closed fender 16 or to hold it in open position as illustrated by dotted lines 16' in Fig. 1.

Fender 16 has an outer face 16a which merges with a continuous inwardly curved crown portion 23 on the forward and rearward sides, and at the top. The outer face and the forward side of the crown merge into an angular box part 24 at the lower forward part of the fender. The inner edges of portions 23 and 24 terminate in a rolled bead 25 arranged to be seated in a rubber preformed sealer 26. This sealer is carried by a flange 27 preferably spot welded to the wheel house wall 14 of body 10.

To secure the closed fender 16 in its "closed" position, in the forward face of the angular box portion 24 an arcuate and inwardly raising depression 30 is formed, to provide a channel to be engaged by the rear end of a downwardly tensioned spring latching arm 31 arranged to be operated by a lever 32 on a vertical stationary spindle 33 welded to the under side of the metal portion 34 of running board 13. Lever 32 has a hub 32a on the inner end which rotates on the spindle 33, and the inner end of arm 31 is also secured to the hub extending substantially at right angles to the lever 32.

As is clear from Fig 4 depression 30 inwardly terminates in a slightly lowered seat 30a, this to hold the downwardly tensioned end of spring latching arm 31 in its locked position. It will be noted that the forward end of the metal portion 34 of running board 13 terminates in a vertical end wall 34'. In this wall a horizontal slot 35 is provided and it terminates in a downwardly declining enlargement 36 to permit the spring latching arm 31 to have sufficient clearance to engage seat 30a and exert a constant downward pressure on closed fender 16 in relation to the body 10.

It is proposed to form the outer end of lever 32 but slightly smaller in diameter than the distance across the flat faces of the hexagon opening of the usual wheel box wrench to permit the use of this wrench as an extension lever.

As is clear from Figs. 3 and 4 the lock mechanism presses the closed fender 16 downwardly in the closed position, in which position the integrally rolled bead 25 presses on the wheel house aligned sealer 26 to water seal the fender to body. When the lever 32 is operated in the opposite direction (forwardly), as spring latching arm 31 is horizontally guided in slot 35, the outer upper end of the spring latching arm will lift the fender by the inclined upper surface of depression 30; however such fender vertical lift is limited by the lower edge of the usually protruding lower door hinge 12. It is important to note that the rear torsion hinge of the closed fender is of yielding torsion hinge material, thereby permitting the driver or operator to move the forward end of the fender but slightly laterally to pass the protruding hinge; thereafter the fender returns to its original plane and is further lifted by the torsion hinge but the width of the automobile is not increased, a known danger when changing tires on a trafficked road.

A torsion hinge is silent, accepts large misalignment and deformations and does not need lubricants and here also serves as a means to hold the closed fender in open position.

Whereas in the applicant's drawing the body side wall is illustrated as being vertical, in many designs this wall slightly rolls toward the center of the car, also necessitating a fender supporting hinge means that permits a slight lateral elastical movement as described above.

Applicant believes the here proposed fender is the production solution of the subject and also believes that an open fender and the addition of a fender shield is but a transition stage.

In Figures 3 and 4 the parts are shown in locked relation. By turning lever 32 in a clockwise direction from that position shown in Figures 3 and 4, the fender is not only released but the fender is forcefully separated from the body. Upon turning lever 32 in a clockwise direction, the outer end of arm 31 slips out of seat 30a and slides along channel depression 30 bearing against the top wall of the channel. The action of the end of arm 31 bearing against the top wall of the channel forcefully separates the fender from the sealing strip 26 on the body because the channel or depression is inclined inwardly. The same movement as above described, causes an intermediate portion of arm 31 to ride along the horizontal guide slot 35. When the end of arm 31 reaches the mouth of the channel 30, it slips free of the fender, and the torsion hinge 20 will cause the fender to swing open to the dotted line position 16' shown in Figure 1.

It will be obvious that the fender will have to be moved to closed position against the force of torsion hinge 20 by hand in which position the lever 32 may be turned when the mouth of channel or depression 30 registers with the end of spring latch arm 31. It is believed the balance of the locking operation is obvious from the description of the releasing operation.

What applicant claims as his invention is:

1. In an automobile, a driving wheel, a wheel house in said body over said wheel, a fender having a portion over said wheel house and an outer face disposed over the major portion of said wheel in the closed position, hinged means connecting a portion of the fender with said body, said hinge exerting a pressure in a direction to separate a portion of the fender from said body, said hinge providing a certain limited lateral movement from the regular swinging path of the fender, and coacting means on the fender and body to lock the fender to the body against the pressure of the hinge in one position, and said coacting means forcefully separating the fender from said body when moved to another position.

2. In combination, an automobile body, a supporting wheel for said body, a mud shield mounted on said body having an outer face enclosing the major portion of said wheel, said shield and body having overlapping edges, coacting means on the body and the shield for locking the shield to the body in closed position, and said coacting means forcefully separating the shield from said body when moved to another position.

3. In combination, an automobile body, a supporting wheel for said body, a fender hinged to said body for movement from an open to a closed position and having an outer face enclosing the major portion of said wheel when in closed position, coacting means on the body and the fender for locking said fender in a closed position as well as for forcefully moving said fender out of its closed and locked position, said means including a latch upon one of said elements and selectively engageable with the other, means supporting said latch for movement in opposite directions, means upon said other element with which said latch engages upon movement in one direction to lock said elements together with said fender in its closed position, and means upon said other element with which said latch engages upon movement in the opposite direction to forcefully separate said elements from the locked and closed position of said fender.

4. In combination, an automobile body, a supporting wheel for said body, a fender having an outer face enclosing the major portion of said wheel in closed position, hinge means connecting the fender to said body, said hinge means exerting pressure in a direction to separate the fender from said body, coacting means on the body and fender for locking the fender to said body in closed position, and said coacting means forcefully separating said fender from said body during the movement from said closed position.

5. In an automobile having a body, and wheels, a wheel housing secured in the body, a wheel concealing mud shield, a torsion hinge for pivotally mounting the shield on the housing having one end connected to the body, the other end of the torsion hinge extending through the housing and secured to the end portion of the shield, and means for normally locking the shield in a lowered wheel covering position.

6. In an automobile having a body, and wheels, a wheel housing secured in the body, a wheel concealing mud shield, a torsion hinge for pivotally mounting the shield on the housing having one end connected to the body, the other end of the torsion hinge extending through the housing and secured to the end portion of the shield, and means for normally locking the shield in a lowered wheel covering position, said locking means forcefully separating the free end of the hinged shield from said housing during the movement of the locking means from the locked position.

7. In an automobile having a body, running board and wheels, a wheel housing secured in the body, a wheel concealing mud shield mounted for vertical swinging movement at its outer end on the body and having a substantially vertical face, a sealing strip on the housing engaged by the edge portion of the shield when the latter is in a closed lowered position, means mounted on the body coacting with the inner end portion of the shield for imparting locking movement in a plane substantially parallel to the vertical face of the shield with the shield in a wheel concealing position.

8. In an automobile having a body, running wheels, a wheel housing secured in the body, a wheel concealing mud shield mounted for vertical swinging movement fulcrumed at its outer end on the body and having a substantially vertical face, a sealing strip on the housing engaged by the edge portion of the shield when the latter is in a closed lowered position, means mounted on the body coacting with the inner end portion of the shield for locking the shield in a wheel concealing position, said locking means being adapted when moved to an unlocking position to separate the inner edge portion of the shield from engagement with the sealing strip by movement in a plane substantially parallel to the vertical face of the shield.

9. In an automobile having a body, running board and wheels, a wheel housing secured in the body, a wheel concealing mud shield mounted for vertical swinging movement at its outer end on the body, a sealing strip on the housing engaged by the edge portion of the shield when the latter is in a closed lowered position, means mounted on the running board coacting with the inner end portion of the shield for locking the shield in a wheel concealing position, said locking means being adapted when moved to an unlocking position to separate the inner edge portion of the shield from engagement with the sealing strip, the pivotal mount for the swinging shield including a torsional hinge for automatically swinging the shield when the latter is unlocked and separated from the sealing strip.

10. In a vehicle, a running wheel encasing structure comprising a fixed part and a removable encasing part, said parts having overlapping edges, engaging means upon said parts, and a manually actuated latch and ejector part movable into different positions and acting through said first means to urge said removable part into assembled relation with said fixed part when moved into one position, and forcibly out of said assembled relation when moved into another position.

11. In a vehicle, a running wheel encasing structure comprising a fixed fender part and a removable fender part, portions of said parts overlapping to provide a joint, a latch member on one of said parts and engaging with a surface on the other of said parts, inclined to the direction of movement of said removable part for disassembly, and manual operating means for said latch member for moving the same into one position to engage said surface to firmly urge said parts into overlapping relation, movement of said manual means to another position forcibly moving said parts out of overlapping relation.

JULES HALTENBERGER.